H. E. DOERR.
FOUR WHEEL TRUCK.
APPLICATION FILED MAR. 11, 1912.
1,030,394.
Patented June 25, 1912.
2 SHEETS—SHEET 2.
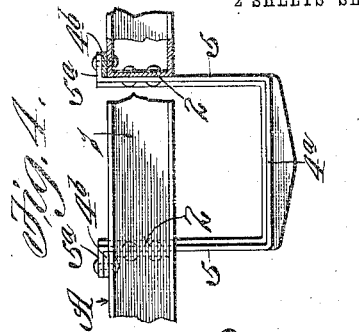
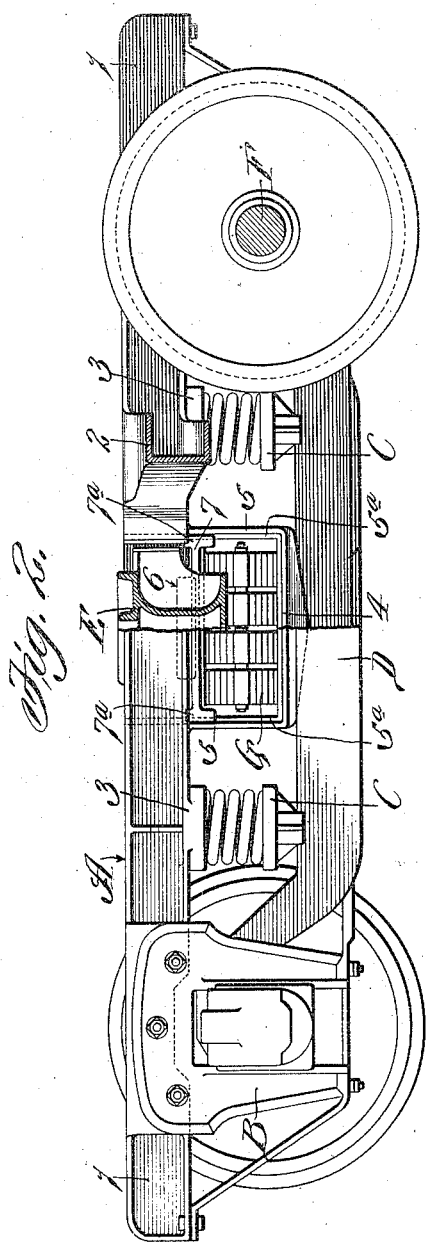
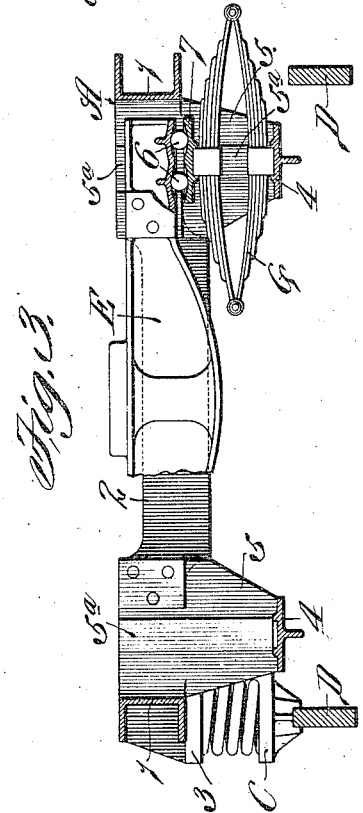
Witnesses:
Geo. R. Radson
C. M. Badger
Inventor
Harry E. Doerr
by Bakewell & Chure attys.

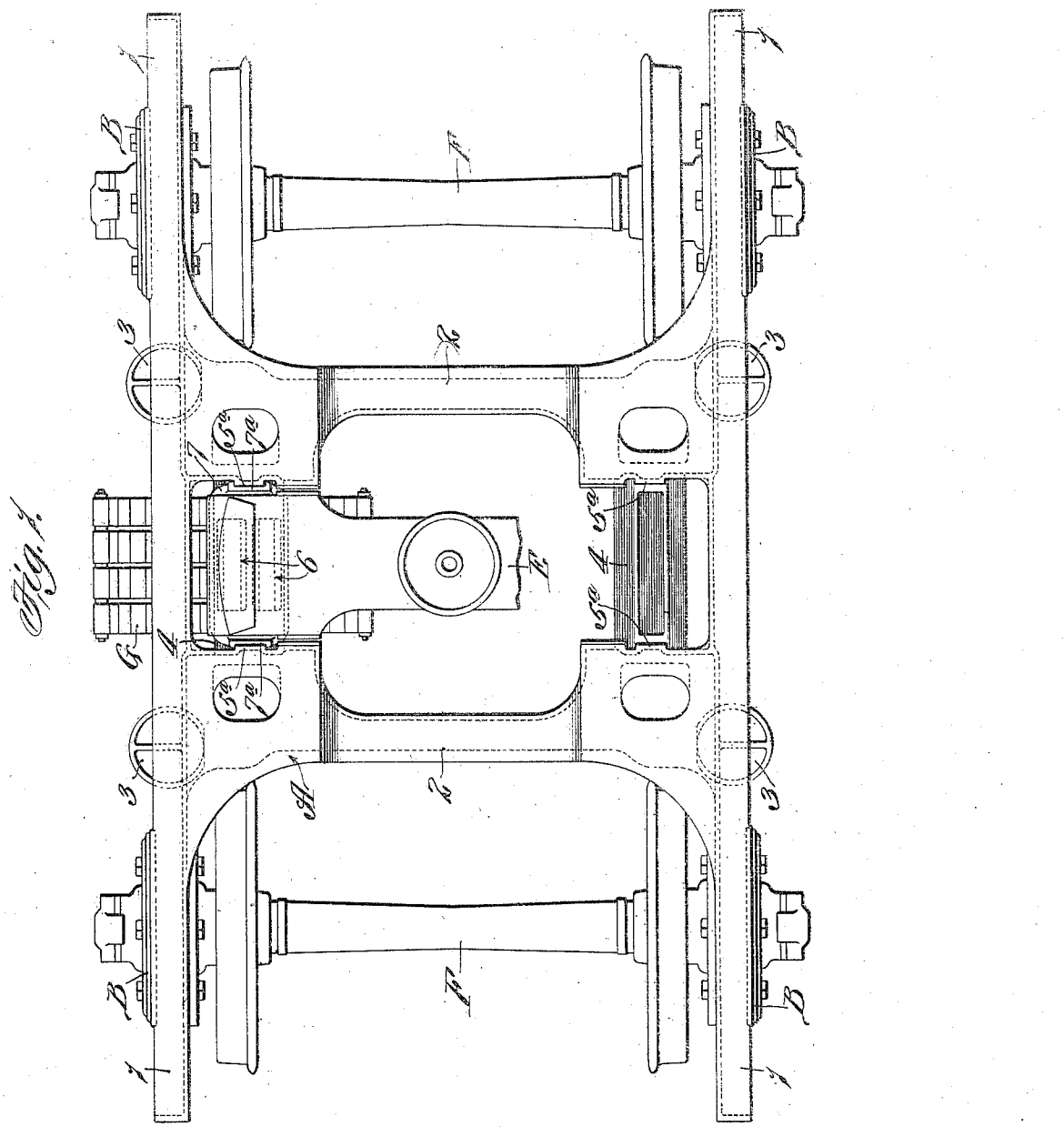

UNITED STATES PATENT OFFICE.

HARRY E. DOERR, OF ST. LOUIS, MISSOURI, ASSIGNOR TO SCULLIN-GALLAGHER IRON & STEEL COMPANY, OF ST. LOUIS, MISSOURI, A CORPORATION OF MISSOURI.

FOUR-WHEEL TRUCK.

1,030,394.

Specification of Letters Patent. Patented June 25, 1912.

Application filed March 11, 1912. Serial No. 682,995.

*To all whom it may concern:*

Be it known that I, HARRY E. DOERR, a citizen of the United States, residing at St. Louis, Missouri, have invented a certain new and useful Improvement in Four-Wheel Trucks, of which the following is a full, clear, and exact description, such as will enable others skilled in the art to which it appertains to make and use the same.

This invention relates to car trucks, and particularly to four-wheel trucks of the type in which the wheel-pieces and transoms are integrally connected together and are preferably formed from a one-piece casting.

One object of my invention is to provide a car truck of the type referred to which is so designed that it is not necessary to use a spring plank and hangers for supporting the bolster.

Another object is to provide a car truck of the type referred to which comprises roller devices that support the bolster and provide for the lateral movement of the bolster. And still another object is to provide an inexpensive and serviceable four-wheel truck frame that has integral seats for the springs which support the bolster.

Other objects and desirable features of my invention will be hereinafter pointed out.

Figure 1 of the drawings is a top plan view of a four-wheel truck frame constructed in accordance with my invention; Fig. 2 is a side elevational view partly in vertical section of the truck illustrated in Fig. 1; Fig. 3 is a vertical cross sectional view of said truck; and Fig. 4 is a detail view illustrating a slight modification of my invention.

Referring to the drawings which illustrate the preferred form of my invention, A designates a one-piece casting comprising a pair of wheel-pieces 1 and two single transoms 2 that connect said wheel-pieces together. The wheel-pieces 1 are preferably channel-shaped in cross section and are arranged with their horizontal flanges projecting outwardly, as shown in Fig. 3, and the pedestals B preferably consist of members that are detachably connected to the wheel-pieces 1. The springs C, which are interposed between the wheel-pieces and the equalizers D, fit in spring seats or pockets 3 on the under sides of the wheel-pieces 1, and the transoms 2 which connect the wheel-pieces together are preferably arranged about midway between the bolster E and the wheel axles F, as shown in Fig. 1, so as to produce a truck frame that is substantially as strong as a frame provided with double transoms on each side of the bolster. Each of the transoms 2 has a relatively narrow intermediate or central portion and two relatively wide end portions, the wide end portions of the transoms coöperating with each other to guide the bolster and prevent it from swaying. Said transoms are approximately channel-shaped in cross section, and the top and bottom flanges thereof are integrally connected to the horizontal flanges of the wheel-pieces 1, the vertical webs of the transoms being also integrally connected at their outer ends to the vertical webs of the wheel-pieces.

The bolster E is supported by springs G which rest upon spring seats that are integrally connected to the wide end portions of the transoms 2, each of said spring seats comprising a horizontally disposed portion 4 on which its coöperating spring G rests, and two vertically disposed side portions 5 whose upper ends are integrally connected to the wide end portions of the transoms 2, as shown clearly in Figs. 2 and 3. Roller bearing devices comprising rollers 6 and roller seat members 7 are arranged between the bolster E and the springs G so as to provide for the lateral motion of the bolster, and the vertically disposed portions 5 of the spring seats are provided on their inner faces with vertically disposed ribs 5ª that fit between laterally projecting lugs 7ª on the roller seat members 7 and thus guide said members and hold them in position. Any suitable type of springs and roller devices may be used for supporting the bolster, and therefore I do not wish it to be understood that my invention is limited to the exact construction illustrated in the drawings for my invention broadly stated consists in a four-wheel truck frame provided with stationary seats or supports for the springs that carry the bolster.

With a four-wheel truck frame of the character above-described there is no danger of the bolster dropping down because the portions that support and carry the bolster are integrally connected to the main portion of the frame. Consequently, a car truck provided with a frame of the construction above-described is a decided improvement on the four-wheel car trucks now in general use in which the bolster is carried by a spring plank that is supported by means of links from the main portion of the frame of the truck. By eliminating the spring plank and the hangers which support same I reduce the weight of the truck and also reduce the cost of manufacture without impairing the efficiency of the truck because the roller devices that are interposed between the bolster and the springs that support the bolster provide for the lateral motion of the bolster.

As previously stated, I prefer to cast the seats or supporting devices for the springs G integral with the transoms 2 that connect the wheel-pieces together but this is not absolutely essential to the successful operation of my truck and therefore said spring seats could be combined with or connected to the main portion of the frame of the truck in various other ways without departing from the spirit of my invention. For example, the spring seats $4^a$ could be detachably connected to the transoms, as shown in Fig. 4, and, if desired, shims $4^b$ could be arranged between the top faces of the transoms and laterally projecting flanges $5^a$ on the upper ends of the side portions of the spring seats so as to vary the height of the spring seats.

Having thus described my invention, what I claim as new and desire to secure by Letters Patent is:

1. A car truck having a frame that comprises wheel-pieces, transoms integrally connected to said wheel-pieces and spaced apart to receive a bolster, spring seats integrally connected to said transoms and constructed to receive the springs that support the bolster of the truck, and a lateral-motion device arranged between the bolster and the springs.

2. A car truck having a frame which comprises wheel-pieces and transoms integrally connected together, a bolster arranged between said transoms, stationary spring seats forming part of said frame, springs carried by said spring seats, and roller devices interposed between said springs and bolster.

3. A car truck having a frame which comprises wheel-pieces and transoms that are integrally connected together, a bolster arranged between said transoms, stationary spring seats forming part of said frame, springs carried by said spring seats, roller devices interposed between said springs and bolster, and means on said spring seat members for guiding the roller seat members of said roller devices and holding them in position.

4. A four-wheel truck having a frame comprising two wheel-pieces and two single transoms integrally connected together, the end portions of said transoms being relatively wider than the intermediate portions of same, a bolster arranged between said transoms and guided by the relatively wide end portions of same, spring seat members integrally connected to the end portions of said transoms and each consisting of a horizontally disposed part and two vertically disposed side parts, springs mounted on the horizontally disposed parts of said spring seat members, roller devices consisting of rollers and roller seat members arranged between said springs and bolster, and ribs on the vertically disposed side parts of said spring seat members which guide the roller seat members of said roller devices.

5. A four-wheel truck having a frame which comprises a single casting consisting of wheel-pieces and two single transoms integrally connected together, and spring seats forming part of said casting and comprising vertically disposed portions integrally connected to said transoms and a cross-piece on which the spring rests.

6. A four-wheel truck having a frame which comprises a single casting consisting of wheel-pieces and two single transoms integrally connected together, spring seats forming part of said casting and comprising vertically disposed portions integrally connected to said transoms and a cross-piece on which the spring rests, and ribs on the vertically disposed portions of said spring seats for guiding the roller seat members of roller devices that provide for the lateral motion of the bolster of the truck.

In testimony whereof I hereunto affix my signature in the presence of two witnesses, this first day of March 1912.

HARRY E. DOERR.

Witnesses:
WELLS L. CHURCH,
GEORGE BAKEWELL.